Patented Sept. 4, 1928.

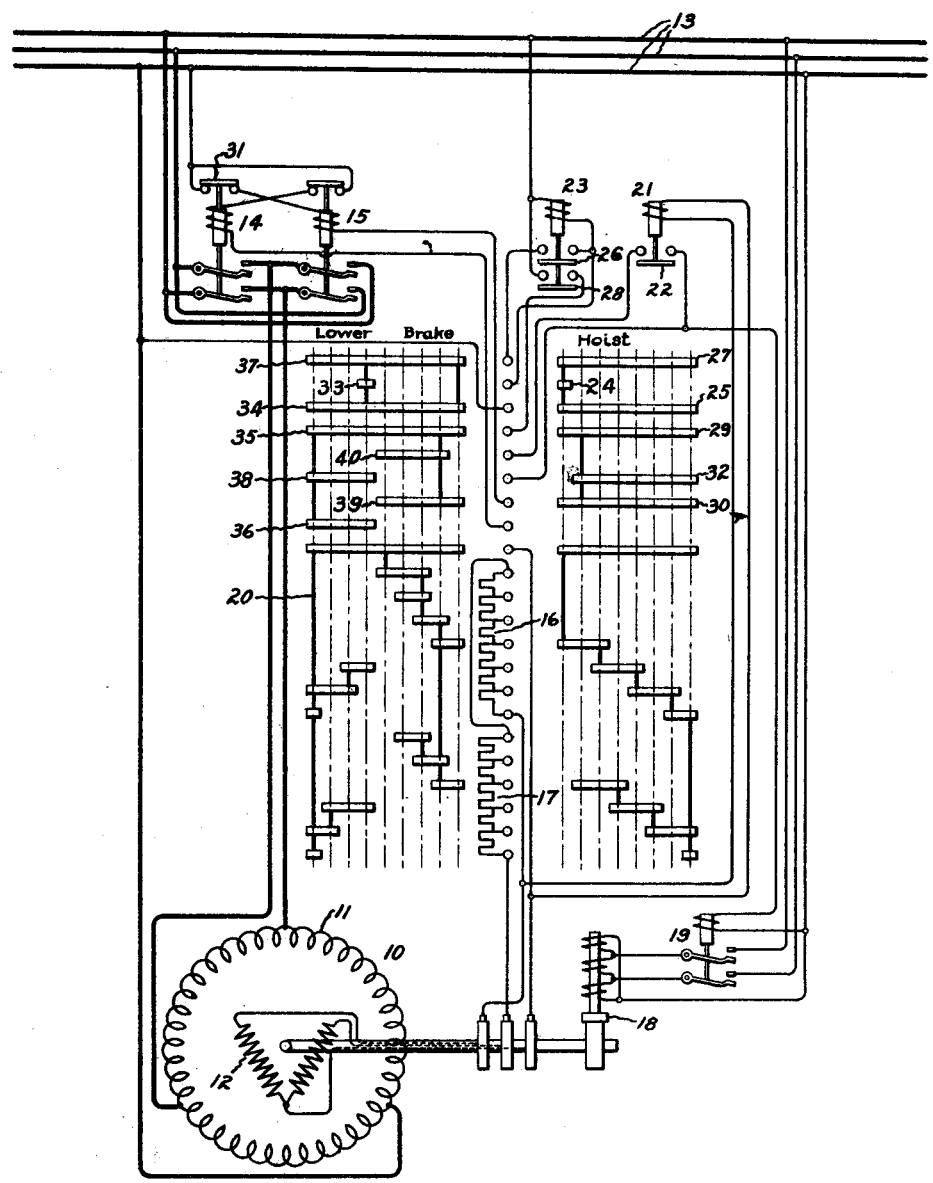

1,683,212

UNITED STATES PATENT OFFICE.

HANS TENGSTRÖM AND KURT BÜHRING, OF BERLIN, GERMANY, ASSIGNORS TO GENERAL ELECTRIC COMPANY, A CORPORATION OF NEW YORK.

MOTOR-CONTROL SYSTEM.

Application filed March 9, 1925, Serial No. 14,276, and in Germany March 31, 1924.

This invention relates to the control of electric motors, and more particularly to the control of reversible electric motors which are provided with brakes and are arranged to drive and be driven by an active load such as a hoist, elevator, or the like.

Heretofore, control systems for motor driven hoists, elevators and the like, have been proposed wherein provision is made for reversing the power connections of the motor so as to oppose the torque of the load in stopping or in lowering with the end in view of relieving the mechanical brake of unnecessary wear as well as effecting a smooth and easy stop or descent of the load. In this form of control system, the counter torque of the motor frequently will exceed the torque of the load and consequently, after stopping the load, the motor may start to drive the load in the reverse direction. Such a reversal in the rotation of the motor ordinarily is undesirable and may lead to serious accidents. In order to overcome this difficulty, various forms of control switches, operated either frictionally or electro-magnetically by the hoist or elevator driving gears, have been arranged to disconnect the motor and apply the friction brakes upon the initial reverse movement of the load. Likewise, centrifugal switches have been employed to effect the disconnection of the motor and the application of the brake when the speed is reduced to a certain value so that undesirable movement in the reverse direction is rendered impossible. However, all of the arrangements heretofore proposed with which we are familiar either require a special construction of the driving gears or necessitate the use of auxiliary mechanical devices to effect the automatic stopping of the motor.

Therefore, the principal object of the present invention is to provide a novel arrangement of control apparatus and circuits whereby the torque of the motor may be reversed so as to oppose the torque of the load and the friction brake may be controlled automatically by means of a simple and reliable electro-responsive device connected in circuit with the motor and arranged to apply the brake should the motor tend to drive the load in the reverse direction.

Although not necessarily limited thereto, the present invention is of particular advantage when applied to the control of an alternating current induction motor driven hoist or elevator having an electro-responsive friction brake and a master controller which is arranged to be moved from an operating position to a braking position for the purpose of reversing the motor power connections to retard the movement of the load. In accordance with the preferred form of the invention, an electro-responsive device is connected to be energized responsively to the secondary voltage of the alternating current motor and cooperates with the master controller to control the application of the brake when the power connections of the motor are reversed. The electro-responsive device is so designed that the brake is applied automatically when the reversal of torque reduces the motor speed and consequently the secondary voltage of the motor below a predetermined value.

For a better understanding of our invention, reference is had to the following description, taken in connection with the accompanying drawing in which the single figure diagrammatically illustrates a control system for an alternating current induction motor driven hoist or elevator embodying the invention.

The novel features and combinations which I believe to be characteristic of our invention are pointed out with particularity in the appended claims.

Referring to the drawing, the electric motor 10 which, as shown, is of the alternating current induction type having primary windings 11 and secondary windings 12, receives power from suitable supply lines 13 through the electrically operated reversing switches 14 or 15. The secondary winding of motor 10 is connected through suitable slip rings, as indicated in the drawing, to the speed controlling resistors 16 and 17, and it will be understood that the motor shaft is connected through suitable driving gear, not shown in the drawing, to operate a hoist or elevator, which may afford an overhauling or active load.

It will be observed that the motor 10 is provided with an electro-responsive brake 18 which is of the three phase type, as shown. Brake 18 is biased to the applied or braking position, and the electro-responsive line switch 19 is arranged to connect the operating windings of brake 18 to the supply lines 13 to operate the brake to the released position.

The master controller 20, having forward, reverse, and intermediate braking positions, as indicated in the drawing, is provided with suitable contact segments for controlling the reversing switches 14 and 15 and the line switch 19 to release the brake 18 and establish power connections for the motor 10 to drive the load at a plurality of speeds in either the forward or the reverse direction, as will be more fully described in connection with the operation of the control system illustrated.

In accordance with the invention, an electro-responsive relay 21 for automatically controlling the brake 18, when the controller 20 is operated to the braking position, is connected to the motor 10 to be energized responsively to an electrical characteristic thereof which varies with the motor speed, which in the preferred embodiment of the invention illustrated is the secondary voltage of the motor. The relay 21 is designed to close its contact 22 when the secondary voltage of the motor is a predetermined amount above the standstill value such as, for example, 1.2 times the standstill voltage, and to open its contact upon the secondary voltage of the motor decreasing below a different predetermined value such as, for example 1.1 times the standstill voltage.

When the master controller is operated to reverse the motor torque during operation of the load at full speed, the secondary voltage of the motor will be approximately double the standstill value. Under these conditions, the contacts of the electro-responsive relay are closed and serve to maintain the electro-responsive brake energized. Should the reverse torque of the motor be sufficient to gradually slow down the load, the secondary voltage of the motor will gradually decrease in a corresponding manner. When the secondary voltage of the motor falls below 1.1 times the standstill voltage, the electro-responsive relay 21 automatically opens its contact 22 to interrupt the energizing circuit of the brake to apply the same. In this way, undesirable reverse movement of the load is rendered impossible and the stopping of the load is accomplished smoothly and gradually without excessive wear on the brakes.

The electro-responsive relay 23 is arranged to cooperate with the master controller 20 and the electro-responsive relay 21 in a manner which will be better understood from the following description of the operation of the control system embodying my invention.

With supply line 13 suitably energized, operation of the master controller 20 to the left into the first hoisting position establishes a circuit from the upper supply line through the operating winding of relay 23, and the segments 24 and 25 of the master controller to the lower supply line 13. The resulting closure of the relay 23 completes a holding circuit for the operating winding thereof through the relay contact 26 and the segment 27 of the master controller. At the same time, an energizing circuit for the reversing switch 15 is established from the upper supply line through the relay contact 28, segments 29 and 30 of controller 20, and thence through the operating winding of reversing switch 15 and the interlocking auxiliary contact 31 of reversing switch 14 to the lower supply line. Thereupon, reversing switch 15 closes and connects the primary windings 11 of motor 10 to the supply line 13 for operation of the motor in the forward direction with a suitable portion of the speed regulating resistors 16 and 17 included in the secondary circuit of the motor. However, since the brake 18 is normally applied, the motor 10 does not start.

Upon operation of master controller 20 to the second forward position, the brake line switch 19 is energized through a circuit extending from the upper supply line through the lower contact 28 of relay 23, the contact segments 29 and 32 of master controller 20, and the operating winding of line switch 19 to the lower supply line. The resulting closure of line switch 19 energizes the operating windings of brake 18 from the supply lines 13 to effect the operation of the brake to the released position. This permits the motor 10 to start and drive the load at slow speed in the forward direction. It will be seen that operation of the master controller 20 through the subsequent forward positions serves to short-circuit the speed regulating resistors 16 and 17 in a step-by-step manner and thus gradually accelerates the motor 10 to full running speed.

Upon the return of master controller 20 toward the off position, successive sections of the speed regulating resistors 16 and 17 are re-inserted in the motor circuit to gradually reduce the operating speed of the motor and when the first hoisting position is reached, the energizing circuit of the brake line switch 19 is interrupted. Thus, the brake 18 is deenergized and immediately returns to the applied position in accordance with its bias. When the master controller 20 is returned to the off position in which it is shown, the reversing switch 15 is deenergized and interrupts the power connections of the motor, the brake 18 serving to maintain the load at rest.

In order to lower the load, master controller 20 is operated to the right through the several braking positions indicated in the drawing, into the first lowering position. During the operation through the braking positions the reversing switches remain unenergized due to the fact that the contacts of relay 23 remain open. However, in the first lowering position, an energizing circuit for relay 23 is established from the upper supply line through the operating winding of the relay and the segments 33 and 34 of master controller 20 to the lower supply line. In this case, an energizing circuit for reversing switch 14 is established upon the closure of the contact 28 of relay 23 through segments 35 and 36 of the controller and a holding circuit for the relay is established through the segment 37 in a manner similar to that previously described. The closure of reversing switch 14 connects the motor 10 to the supply lines 13 for operation in the direction required to lower the load. The brake line switch 19 is energized through segment 38 simultaneously with the energization of reversing switch 14 upon the closure of relay 23 when the master controller 20 is in the first lowering position, and consequently the motor 10 at once starts to drive the load in the lowering direction.

Should the load fail to overhaul the motor and thus require power to lower it, the master controller 20 may be operated to remove a portion of the speed controlling resistors 16 and 17 from the secondary circuit to increase the speed of descent.

If, however, the load should overhaul motor 10 and tend to rapidly accelerate the motor, master controller 20 is immediately returned to the first braking position indicated in the drawing to oppose the torque of the motor to the active torque present by the overhauling load. When master controller 20 is returned from the lowering position to the first braking position, the energizing circuit of reversing switch 14 is interrupted at segment 36 and an energizing circuit for reversing switch 15 is established at segment 39, the relay 23 being maintained closed through the holding circuit previously established. It will be evident that upon the opening of reversing switch 14 and the closing of reversing switch 15 the torque of motor 10 will be reversed so as to oppose the torque of the load.

If the speed of the motor is excessive, the secondary voltage of the motor will be at a correspondingly high value sufficient to operatively energize the relay 21. Hence, upon the operation of master controller 20 into the first braking position, the brake line switch 19 will be maintained energized through a circuit extending from the upper supply line through the contact 28 of relay 23, the segments 35 and 40 of the controller, the contact 22 of relay 21 and the operating winding of line switch 19 to the lower supply line. Under these conditions the brake 18 is maintained released and the active torque of the overhauling load is opposed solely by the reverse torque of motor 10. By operating the master controller 20 to the successive braking positions, the resistors 16 and 17 in the secondary circuit of motor 10 may be controlled to vary the motor torque to any value desired. In this way, the torque of the motor 10 may be controlled to exert a braking effect of any desired value to limit the speed of descent of the load.

If the reverse torque of the motor should be increased to a value in excess of the torque of the overhauling load, the motor will gradually stop the descent of the load and start to drive the load in the reverse or hoisting direction. However, in accordance with my invention, this undesirable reverse movement of the load is effectively prevented through the agency of the relay 21. When the reverse torque of the motor predominates and the motor speed begins to decrease, the secondary voltage of the motor also decreases. When the secondary voltage is reduced below 1.1 times the standstill voltage, the relay 21 opens its contact 22 and thereby interrupts the energizing circuit of the brake line switch 19. The resulting opening of line switch 19 deenergizes the operating windings of brake 18 and the latter at once returns to the applied position in accordance with its bias while the power connections of the motor are maintained. In this way, the brake 18 is automatically applied before the reverse torque of motor 10 can effect any movement of the load in the reverse or hoisting direction.

Upon the automatic application of brake 18, the master controller 20 may be returned to the off position in which it is shown, to interrupt the energizing circuit of reversing switch 15 and thereby deenergize motor 10.

In accordance with the provisions of the patent statutes, we have described the principle of operation of our invention, together with the apparatus which we now consider to represent the best improvement thereof, but we would have it understood that the apparatus shown is only illustrative and that the invention may be carried out by other means.

What we claim as new and desire to secure by Letters Patent of the United States is:—

1. In a motor control system, the combination with a reversible electric motor, of switch mechanism for controlling the power connections of the motor to reverse the torque thereof when the motor is rotating in one direction, a brake for the motor, and electro-responsive means in circuit with the motor for applying the brake upon a predetermined reduction in the speed of rotation of the motor in said one direction to thereby insure against the reversed motor torque causing rotation of the motor in the other direction, said brake being applied while the power connections of the motor are maintained by the switch mechanism.

2. In a motor control system, the combination with a reversible electric motor arranged to drive and be driven by an active load, of switch mechanism for establishing power connections for the motor to drive the load in each direction of rotation and for controlling the power connections of the motor to reverse the torque thereof when the motor is driven by the load, a brake for the motor, and electro-responsive means energized responsively to an electrical characteristic of the motor which varies with the speed thereof and cooperating with said switch mechansm to apply the brake when the motor torque is reversed and the motor speed is below a predetermined value, said brake being applied while the power connections of the motor are maintained by the switch mechanism.

3. In a motor control system, the combination with a reversible electric motor and a normally applied brake therefor, of means for releasing the brake and establishing power connections to operate the motor in either direction, said means being arranged to control the power connections of the motor to reverse the torque thereof and to permit application of the brake when the motor is operating in a predetermined direction, and electro-responsive means in circuit with the motor and cooperatng with said means for preventing application of the brake when the motor torque is reversed and the motor speed is above a predetermined value and for applying the brake while the power connections of the motor are maintained by the switch mechanism when the speed of the motor falls below the predetermined value.

4. In a motor control system, the combination of a reversible electric motor arranged to drive and be driven by an active load, electro-responsive reversing switch mechanism for the motor, an electro-responsive brake for the motor, master switch mechanism operable to control the energization of said brake to release the same and to control the energization of said reversing switches to establish power connections for the motor to drive the load in either direction, said master switch mechanism being operable to control the energization of said brake to apply the same and to control the energization of said reversing switches to establish power connections to reverse the torque of the motor when the motor is driven by the load, and electro-responsive means connected to be energized responsively to an electrical characteristic of the motor which varies with the speed thereof and cooperating with the said master switch to prevent application of the said brake while the motor torque is reversed and the motor speed is above a predetermined value and for applying the brake while the power connections of the motor are maintained by the switch mechanism when the speed of the motor falls below the predetermined value.

5. A control system for an alternating current induction motor arranged to drive and be driven by an active load comprising switch mechanism for establishing power connections for the motor to drive the load in each direction and for reversing the power connections of the motor when the motor is driven by the load, a brake for the motor, and means including an electro-responsive device connected to be energized responsively to the secondary voltage of the motor and co-operating with the said switch mechanism for applying the brake when the motor torque is reversed and the secondary voltage of the motor is below a predetermined value, said brake being applied while the power connections of the motor are maintained by the switch mechanism.

6. A control system for an alternating current induction motor arranged to drive and be driven by an active load comprising a normally applied electro-responsive brake for the motor, switch mechanism for establishing power connections to release the brake and operate the motor to drive the load in either direction, said switch mechanism being operable to reverse the motor torque and apply the brake when the motor is driven by the load, and an electro-responsive relay connected to be energized responsively to the secondary voltage of the motor and cooperating with said switch mechanism to maintain the brake released when the motor torque is reversed and the secondary voltage of the motor is above a predetermined value and for applying the brake while the power connections of the motor are maintained by the switch mechanism when the secondary voltage of the motor falls below the predetermined value.

7. A control system for an alternating current induction motor arranged to drive and be driven by an active load comprising electro-responsive reversing switches for the motor, a normally applied electro-responsive brake for the motor, an electro-responsive line switch for the brake, a master controller and connections for controlling the said reversing switches and the said line switch to release the brake and operate the motor to drive the load in either direction, said controller being operable to reverse the motor torque and apply the brake when the motor is driven by the load and the power connections of the motor are being maintained, and an electro-responsive relay connected to be energized responsively to the secondary voltage of the motor and cooperating with the said controller to control the said line switch to maintain the brake released after the reversal of the motor torque and until the secondary voltage of the motor is below a predetermined value.

8. A control system for an alternating current induction motor arranged to drive and be driven by an active load comprising electromagnetic reversing switch mechanism for connecting the motors to a source of supply for operating in either direction, a normally applied electromagnetic brake for the motor, master switch mechanism having a forward, reverse, and a braking position for controlling said reversing switch mechanism and said brake, an electro-responsive relay and connections controlled thereby whereby upon operation of the master switch from the reverse position to the braking position, the said reversing switches are operated to reverse the torque of the motor, and a second electro-responsive relay connected to be energized responsively to the secondary voltage of the motor, and connections jointly controlled by said relays and said master switch mechanism whereby upon reversal of the motor torque the said electro-responsive brake is maintained released until after the secondary voltage of the motor is reduced below a predetermined value and the said electro-responsive brake is applied while the motor is connected to the source of supply and when the secondary voltage of the motor is reduced below the predetermined value.

In witness whereof, we have hereunto set our hands this 10th day of February, 1925.

HANS TENGSTRÖM.
KURT BÜHRING.